United States Patent [19]

Brudi

[11] E Re. 28,623

[45] Reissued Nov. 25, 1975

[54] PUSH-PULL ATTACHMENT FOR LIFT TRUCKS

[75] Inventor: Ronald A. Brudi, Longview, Wash.

[73] Assignee: Brudi Equipment, Inc., Longview, Wash.

[22] Filed: Apr. 9, 1973

[21] Appl. No.: 348,995

Related U.S. Patent Documents

Reissue of:

[64] Patent No.: 3,640,414
Issued: Feb. 8, 1972
Appl. No.: 15,385
Filed: Mar. 2, 1970

[52] U.S. Cl. ..... 214/514
[51] Int. Cl.² ..... B60P 1/02
[58] Field of Search ..... 214/514, 730, 731, 700, 214/660, 672, 673, 674, 82, 77 P

[56] References Cited

UNITED STATES PATENTS

| | | | |
|---|---|---|---|
| 2,371,661 | 3/1945 | Wilms | 214/514 |
| 2,616,578 | 11/1952 | Dunham | 214/514 X |
| 2,620,936 | 12/1952 | Abbe | 214/514 |
| 3,039,636 | 6/1962 | Hoyt et al. | 214/514 |

*Primary Examiner*—Albert J. Makay
*Attorney, Agent, or Firm*—Chernoff & Vilhauer

[57] ABSTRACT

A novel lazy tongs has offset pivotal connections between the arms of the linkage allowing the arms to fold together compactly in vertical positions. The lazy tongs linkage actuates a push frame for pushing a load off the forks of the lift truck. An adjustable length connection between the upper forward arm and the push frame allows the upper end of the push frame to be tilted backward in extended position of the linkage so that the thrust may be applied principally at the bottom of the load. Since the adjustable length arm is vertical in retracted position, the push frame is always vertical in retracted position regardless of its tilt in extended position. The rearward tilt of the push frame in extended position is also advantageous in grasping sheetlike pallets to pull a pallet load onto the forks of the truck. The lower edge of the push frame may be equipped with pallet grippers for this purpose.

10 Claims, 4 Drawing Figures

PUSH-PULL ATTACHMENT FOR LIFT TRUCKS

Matter enclosed in heavy brackets [ ] appears in the original patent but forms no part of this reissue specification; matter printed in italics indicates the additions made by reissue.

BACKGROUND OF THE INVENTION

This invention relates to an improved push-pull attachment for lift trucks and has particular reference to an improved lazy tongs linkage for tilting a push frame backward in pushing a load off the forks of the truck and in grasping a sheetlike pallet to pull a load onto the forks.

In pushing a load off the forks of a lift truck it is often desirable to apply the major thrust at the bottom of the load in order to avoid pushing the top of the load forward out of vertical alignment, especially when the load is of a deformable nature such as stack of boxes or the like. On the other hand, it is not desirable to mount the push frame in a permanently backward tilted position because then the push frame will not retract compactly against the back of the fork lift carriage. Compact folding of the pusher linkage is essential in order to position the load as close to the front wheels of the truck as possible in carrying and lifting the load. When the push frame is not retracted compactly against the back of the lift carriage, the center of gravity of the load is located farther forward from the wheels causing the truck to overbalance and thereby reducing the carrying capacity of the truck. For this reason it has heretofore been considered impractical to tilt the push frame backward, with the result that the top of the load is frequently pushed forward out of vertical alignment, particularly if the mast and forks of the truck are tilted slightly forward when the load is discharged.

A similar problem arises in pulling a load onto the forks of the truck by means of a sheetlike pallet. In order to adapt a lift truck for the use of sheetlike pallets, a gripper is mounted at the lower edge of the push frame to grasp a protruding edge of the pallet sheet. To perform this manipulation, it is usually necessary to tilt the mast of the truck forward in order to place the grippers within an inch or so of the floor. But when the mast is tilted forward, a normally vertical push frame is also tilted forward, causing the upper end of the push frame to encounter the load before the grippers are close enough to the bottom of the load to grasp the pallet sheet. This makes it quite difficult to use sheetlike pallets with a conventional lift truck notwithstanding the great advantage of such pallets for handling certain types of merchandise.

Objects of the invention are, therefore, to provide an improved extending and retracting mechanism for tilting the push frame on a lift truck in extended position without any sacrifice of space in retracted position, to provide means for tilting the push frame backward when extended and then returning the push frame to vertical position when retracted, to provide an improved lazy tongs linkage for such purpose and to provide a push-pull mechanism which is better adapted to handle sheetlike pallets.

SUMMARY OF THE INVENTION

According to the present invention, the push frame is extended and retracted by a pair of vertical lazy tong linkages on opposite sides of the lift carriage. The pivotal connections between the arms of each lazy tongs are offset so that all the arms fold compactly in vertical positions when the push frame is retracted. The upper forward arm of each lazy tongs is provided with a length adjustment adjacent a sliding connection with the upper part of the push frame. By means of this length adjustment the push frame may be caused to assume a conventional vertical position when fully extended or it may be caused to tilt backward so that the principal thrust in discharging a load from the lift forks is applied at the bottom of the load. Since the adjustable length arms are vertical when fully retracted, this length adjustment does not disturb the vertical position of the push frame in retracted position. Thus, regardless of the tilt of the push frame when extended, it always returns to compact vertical position when retracted.

A backward tilting push frame is especially advantageous in pulling a load onto the lift forks by means of a sheetlike pallet. A backward tilt of the push frame places the pallet grippers at the lower edge of the push frame close to the bottom of the load even when the mast is tilted forward to place the grippers and the forward ends of the forks as close to floor level as possible. The tilt adjustment of the push frame thereby provides a two-fold advantage in the use of lift trucks equipped with the invention.

The invention will be better understood and additional objects and advantages will become apparent from the following description of the preferred embodiment illustrated in the accompanying drawings. Various changes may be made in the details of construction and arrangement of parts and certain features may be used without others. All such modifications within the scope of the appended claims are includes in the invention.

DESCRIPTION OF THE PREFERRED EMBODIMENT

Figures 1, 2:
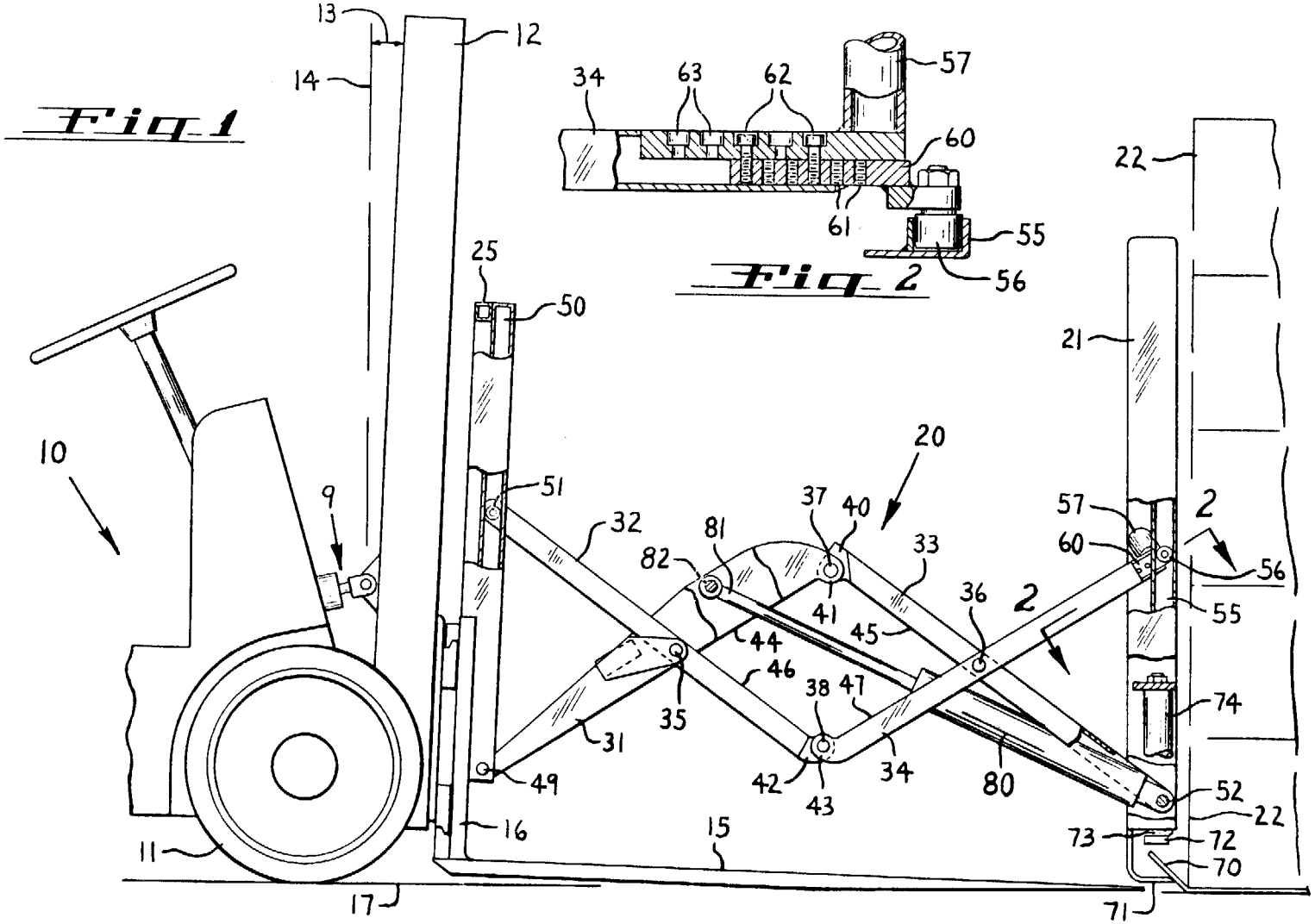
FIG. 1 is a side elevation view with parts broken away, showing a lift truck embodying the invention wherein the push frame mechanism is extended to grasp a sheetlike pallet.
FIG. 2 is a view on the line 2—2 in FIG. 1.
Figure 4:
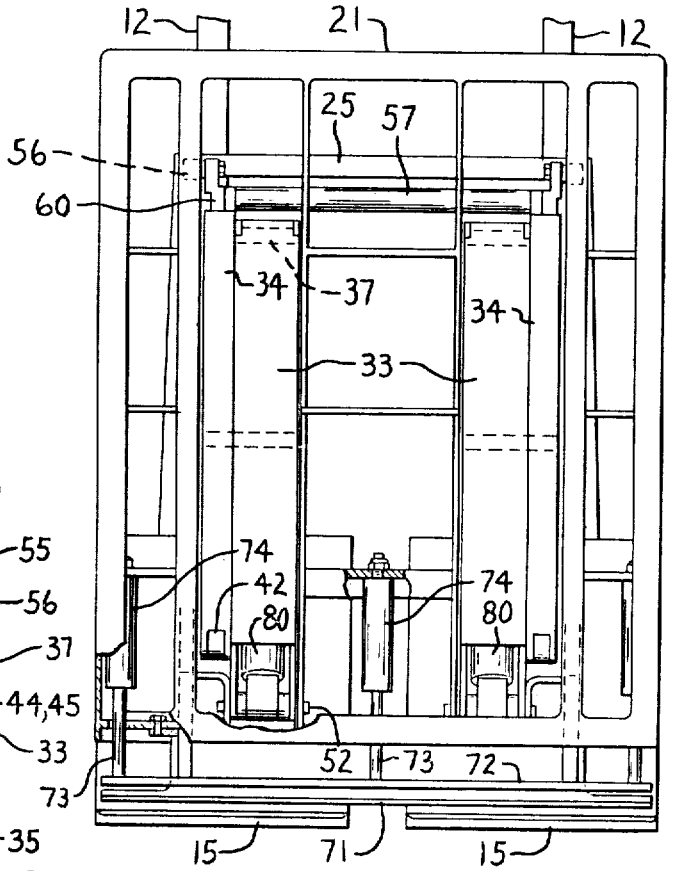
FIG. 4 is a front elevation view of FIG. 3 with parts broken away.

The numeral 10 designates generally a conventional lift truck having front wheels 11 and a mast 12 and equipped with a cylinder and piston rod 9 for tilting the mast. As shown in FIG. 1, the mast is tilted forward through a small angle 13 with respect to vertical line 14. As is understood by persons skilled in the art, the mast may be moved to vertical position 14 and it may also be tilted backward behind vertical line 14 for carrying and lifting a load.

The load is carried on forwardly extending forks 15 on a lift carriage 16 which moves vertically on mast 12. In most cases the mast 12 is an extension type of mast having telescoping, vertically sliding sections which may be raised to considerable height for the purpose of stacking and unstacking merchandise or other objects. In FIG. 1, carriage 16 is in its lowermost position whereby the forward tilt of the mast causes the front ends of forks 15 to be depressed to the floor level 17.

The invention resides in a novel and improved lazy tongs linkage 20 for extending and retracting a vertical or near vertical push frame 21 which is arranged to push a load 22 off the forks 15. Push frame 21 is supported at its opposite sides by a pair of the lazy tongs 20, one on each side of the truck. The lazy tongs, in turn, are supported by a vertical frame 25 on the lift carriage 16.

Each lazy tongs linkage comprises four arms 31, 32, 33 and 34. Arms 31 and 32 are pivotally connected together intermediate their ends by pins 35, and arms 33 and 34 are pivotally connected together intermediate their ends by pins 36. The forward end of arm 31 is pivotally connected to the rear end of arm 33 by a pin 37, and the forward end of arm 32 is pivotally connected to the rear end of arm 34 by pin 38.

Pin 37 passes through a central tongue 40 on arm 33 and a pair of ears on arm 31 which straddle the tongue 40. Similarly, the pin 38 passes through a central tongue 42 on the arm 32 and a pair of ears 43 on the arm 34 which straddle the tongue 42. Arms 31 and 33 are disposed in a common vertical plane and arms 32 and 34 are disposed in a common vertical plane alongside arms 31 and 33.

Figure 3:
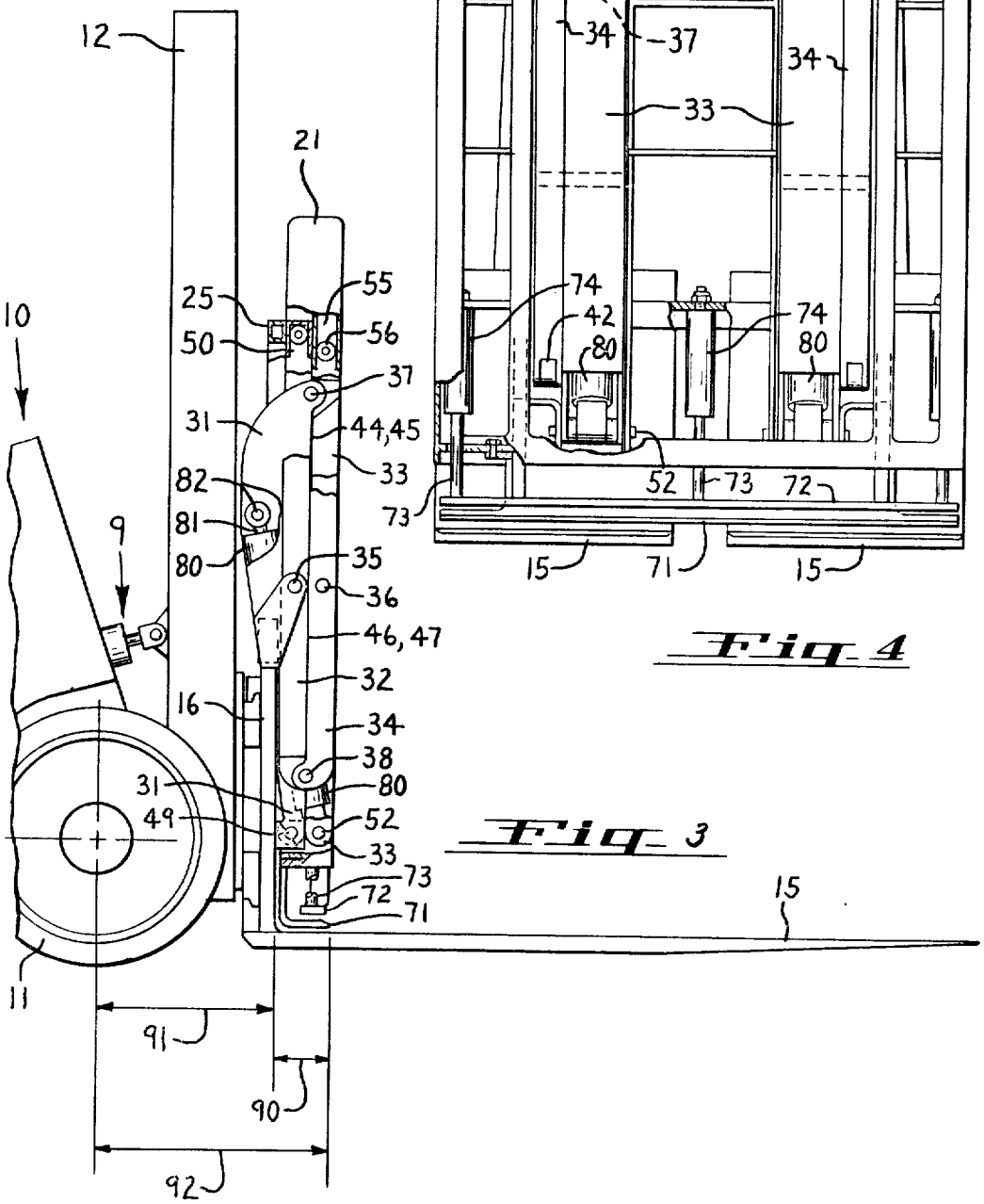
FIG. 3 is a view similar to FIG. 1 but with the push frame retracted.

Pins 37 and 38 are offset relative to the arms so that the axis of pin 37 lies in the plane of an underneath flat side 44 of arm 31 and also in the plane of an underneath flat side 45 of arm 33. Similarly, the axis of pin 38 is offset so that it lies in the plane of an upper flat side 46 on arm 32 and an upper flat side 47 on arm 34. Thus, the lazy tongs linkage is adapted to fold compactly together as shown in FIG. 3 with flat surface 45 lying against flat surface 44 and flat surface 47 lying against flat surface 46, all of these surfaces being disposed in a common transverse plane parallel with the planes of supporting frame 25 and mast 12. This compact folding feature is of particular advantage when lift carriage 16 is equipped with a side shifting mechanism which occupies some additional space between the mast and the load, spacing the load farther forward from wheels 11.

The rear end of arm 31 is pivotally mounted on a pin 49 in the lower end of a vertical channel track 50 mounted on frame 25. The rear end of arm 32 is equipped with a roller 51 which rides in the channel track. Similarly, the front end of arm 33 pivots on a pin 52 in the lower end of a vertical channel track 55 on push frame 21 and the front end of arm 34 carries a roller 56 which travels in the channel track.

The linkage geometry is such that pins 37 and 38 always remain in a common transverse plane parallel with channel track 50, but the length of arm 34 is adjustable so that push frame 21 in extended position may be made parallel to frame 25 or tilted relative thereto as desired. The forward ends of arms 34 in the two lazy tongs are stabilized by a slightly offset transverse tie rod 37.

Any suitable form of length adjustment may be provided for the arms 34, a preferred embodiment being illustrated in FIG. 2. Roller 56 is mounted on a bar 60 which telescopes in hollow arm 34. Bar 60 is provided with a series of tapped holes 61 to receive cap screws 62 in selected holes 63 in arm 34.

When bar 60 is adjusted to make arm 34 the same effective length as arm 33, push frame 21 will remain parallel to the plane of support frame 35 in all positions of the lazy tongs linkage. By adjusting bar 60 to shorten the effective length of arm 34 it will be apparent that push frame 21 in extended position may be tilted backward relative to support frame 25 as shwon in FIG. 1. However, when the linkage is folded to its FIG. 3 position both arms 33 and 34 become parallel with support frame 25 and a transverse plane through the axes of pin 52 and roller 56 is parallel with frame 25. Hence, in fully retracted position, push frame 21 is always parallel with support frame 25 regardless of the length adjustment of arm 34 because any variation in length merely shifts the roller 56 up or down parallel with frame 25.

In order to handle sheetlike pallets 70, the lower end of push frame 21 is equipped with a lower stationary clamp jaw 71 extending across the width of the push frame. An upper clamp jaw 72 is actuated by piston rods 73 in one or more fluid pressure cylinders 74.

In approaching a load 22 on a pallet sheet 70, the mast 12 may be tilted forward to cause lower clamp jaw 71 to pass under an upfolded edge on the pallet sheet 70 as shown in FIG. 1. Then by causing claim jaw 72 to grip the pallet sheet, the load may be drawn onto forks 15 by operation of a fluid pressure cylinder 80 in each lazy tongs. When push frame 21 cannot be tilted back to vertical position as shown, the upper end of the forward tilted push frame encounters the side of load 22, before the clamp jaws are close enough to grasp the pallet sheet.

One end of cylinder 80 is connected to pivot 52 and a piston rod 81 extending from the opposite end of the cylinder is pivotally connected to a pin 82 in the arm 31. Drawing piston rod 81 into the cylinder folds the lazy tong linkage into its FIG. 3 position and pulls the load onto the forks 15. Extension of piston rod 81 from cylinder 80 causes push frame 21 to push the load off the forks 15.

By appropriate length adjustment of the arms 34 of the two lazy tongs the thrust exerted by the two piston rods 81 will be applied to the lower part of the load, even though the mast 12 is tilted forward as shown in FIg. 1. The connection of cylinder 80 directly to pin 52 is advantageous in providing direct thrust against the lower portion of push frame 21 and thereby minimizing stress on the linkage. This permits a lightweight construction of the linkage arms which also makes for a compact assemblage when folded. Similarly, in pulling the load onto forks 15, the pull is exerted on pin 52, close to clamp jaws 71 and 72, minimizing stress on the linkage.

Clamp jaws 71 and 72 may be omitted when elevated pallets are used instead of sheetlike pallets.

FIG. 3 illustrates the necessity for compact folding of the lazy tongs linkage. Dimension 90 indicates the space occupied by the push frame attachment in front of the back plate of lift carriage 16. Dimension 91 indicates the distance of the lift carriage back plate ahead of the front wheel axis. The sum of these two dimensions is equal to dimension 92 which measures the distance from the wheel axis to the back side of the load. It will be apparent that any reduction in dimension 90 places the center of gravity of the load that much closer to the wheel axis, thereby increasing the load which the truck may safely carry without danger of overbalancing.

I claim:

1. In a lift truck having a load carriage mounted for vertical movement on a mast, a push frame for pushing a load off said carriage, and a pair of lazy tongs on opposite sides of said carriage for operating said push frame, each of said lazy tongs having an arm pivotally connected to a lower portion of said push frame and an arm movable in a vertical guide in said push frame above said pivotal connection, said last arm being a straight, rigid unitary member of a length to tilt said push frame backward as the push frame is extended, said two arms folding into side by side positions parallel with each other and parallel with said mast when the push frame is retracted, causing said push frame to retract to a position parallel with said mast regardless of the length of said last arm.

2. The invention of claim 1 including a length adjustment in said last arm to vary the angle of tilt of said push frame in extended position.

3. The invention of claim 1, said lazy tongs having four arms connected together in pairs on offset pivots causing pairs of the arms to lie flat against each other in a common transverse plane of contact parallel with said mast, whereby said push frame is retracted to a position parallel with said mast regardless of its angle of tilt in extended position.

4. The invention of claim 1 including a cylinder and piston unit having one end connected with said pivotal connection on said push frame and its opposite end connected with an arm of said lazy tongs.

5. The invention of claim 1 including pallet clamp means on the lower end of said push frame for pulling a sheetlike pallet onto said load carriages when said push frame is retracted.

6. In a lift truck having a load carriage mounted for vertical movement on a mast, a push frame for pushing a load off said carriage, a pair of lazy tongs on opposite sides of said carriage for operating said push frame, each of said lazy tongs having four arms connected together in pairs on offset pivots causing pairs of the arms to lie flat against each other in a common transverse plane of contact parallel with said mast, one of said arms being pivotally connected to a lower portion of said push frame and another of said arms being movable in a vertical guide above said pivotal connection, said last arm consisting of two parts which are adjustable relative to each other to either lengthen or shorten the arm to tilt said push frame either forward or backward in the extended position of the lazy tongs, and a cylinder and piston unit having one end connected with said pivotal connection on said push frame and its opposite end connected with an arm of said lazy tongs for extending and retracting said push frame.

*7. In a lift truck having a load carriage mounted for vertical movement and means for selectively tilting said load carriage forwardly or backwardly with respect to said truck, a push frame movable forwardly and rearwardly relative to said carriage for pushing a load off said carriage and selectively extensible and retractable linkage means coupling said push frame and said carriage for operating said push frame, said linkage means comprising a pair of arms extending forwardly and rearwardly between said carriage and said frame and pivoted to one another at a point intermediate the ends thereof, each said arm having an upper coupling and a lower coupling respectively on either side of said pivot point for coupling said arm between said carriage and frame, the length of one of said arms between its upper coupling and said pivot point being less than the length of said other arm between its lower coupling and said pivot point so as to cause backward tilting of said push frame relative to said carriage in response to the extension of said linkage means.*

*8. The invention of claim 7 including pallet clamp means on the lower end of said push frame for engaging a sheetlike pallet when said frame is extended and for pulling said pallet onto said load carriage by the retraction of said push frame.*

*9. An attachment for a lift truck load carriage comprising a push frame adapted to move forwardly and rearwardly relative to said carriage for pushing a load off said carriage and selectively extensible and retractable linkage means for coupling said push frame with said carriage and operating said push frame, said linkage means comprising a pair of arms adapted to extend forwardly and rearwardly between said carriage and said frame and pivoted to one another at a point intermediate the ends thereof, each said arm having an upper portion and a lower portion respectively on either side of said pivot point and coupling means on each of said portions for coupling said arm between said carriage and said push frame, the upper portion and coupling means of one arm connected to the push frame being less extensive in the extended position from the intermediate pivot than the respective bottom portion and coupling means of the other arm thereby causing backward tilting of said push frame relative to said carriage automatically upon extension of said linkage means and independently of any force exerted against said push frame by said load.*

*10. The invention of claim 9 including pallet clamp means on the lower end of said push frame for engaging a sheetlike pallet when said frame is extended and for pulling said pallet onto said load carriage by the retraction of said push frame.*

* * * * *

UNITED STATES PATENT AND TRADEMARK OFFICE

CERTIFICATE OF CORRECTION

PATENT NO. : RE 28,623

DATED : November 25, 1975

INVENTOR(S) : Brudi, Ronald

It is certified that error appears in the above-identified patent and that said Letters Patent are hereby corrected as shown below:

| | | |
|---|---|---|
| Col. 3, | Line 23 | After "and a pair of ears" insert --41--; |
| | Line 62 | Change "37" to --57--. |
| Col. 4, | Line 7 | Change "shwon" to --shown--; |
| | Line 45 | Change "FIg." to --FIG.--. |

Signed and Sealed this

*twenty-fifth* Day of *May 1976*

[SEAL]

*Attest:*

RUTH C. MASON
*Attesting Officer*

C. MARSHALL DANN
*Commissioner of Patents and Trademarks*